June 13, 1967  W. J. WESTENDORF  3,324,954
LOADER DEVICE AND METHOD OF MOUNTING SAME ON TRACTOR
Filed March 1, 1965  3 Sheets-Sheet 2
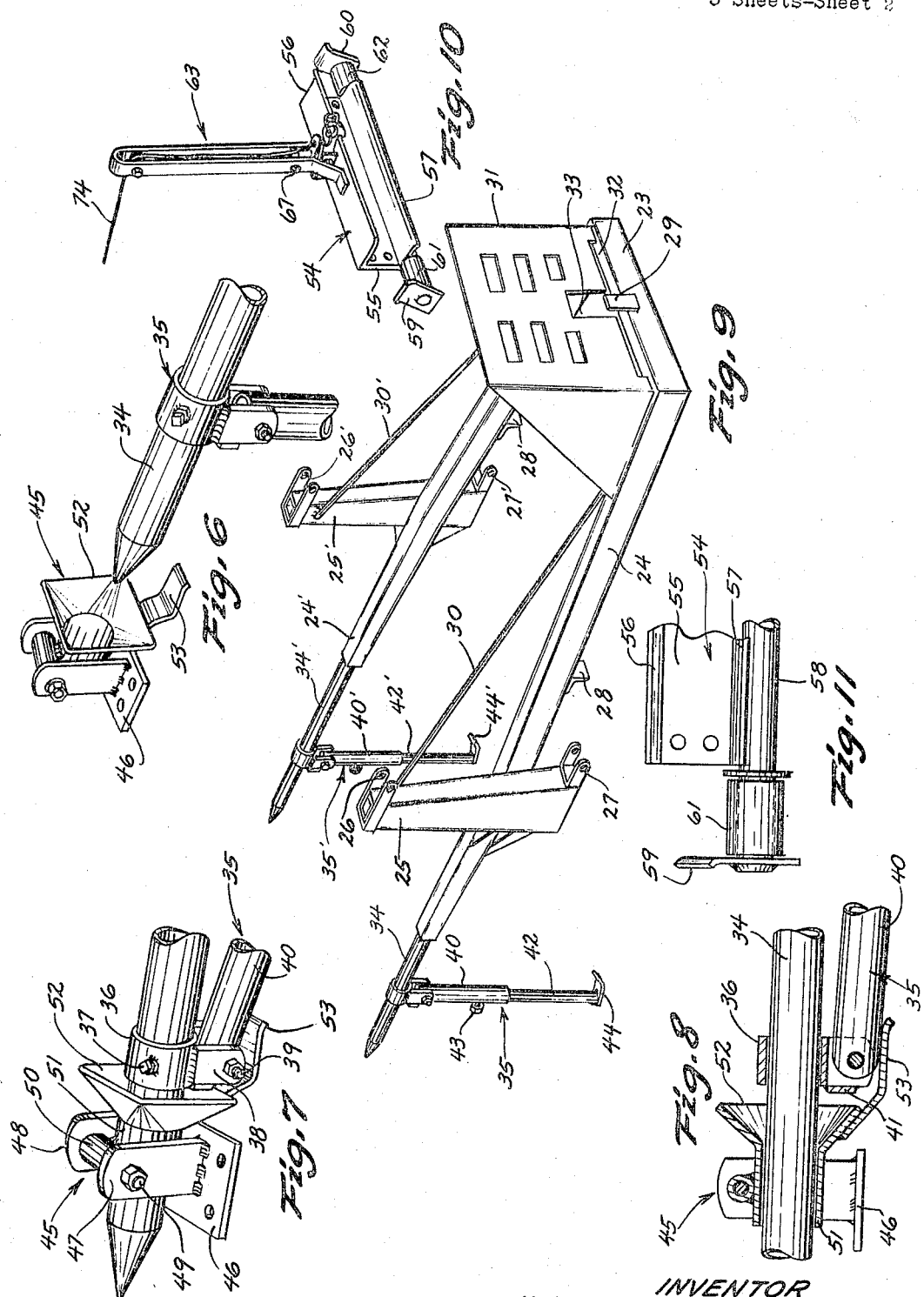
INVENTOR
WALTER J. WESTENDORF
BY Dick & Zarley
ATTORNEYS

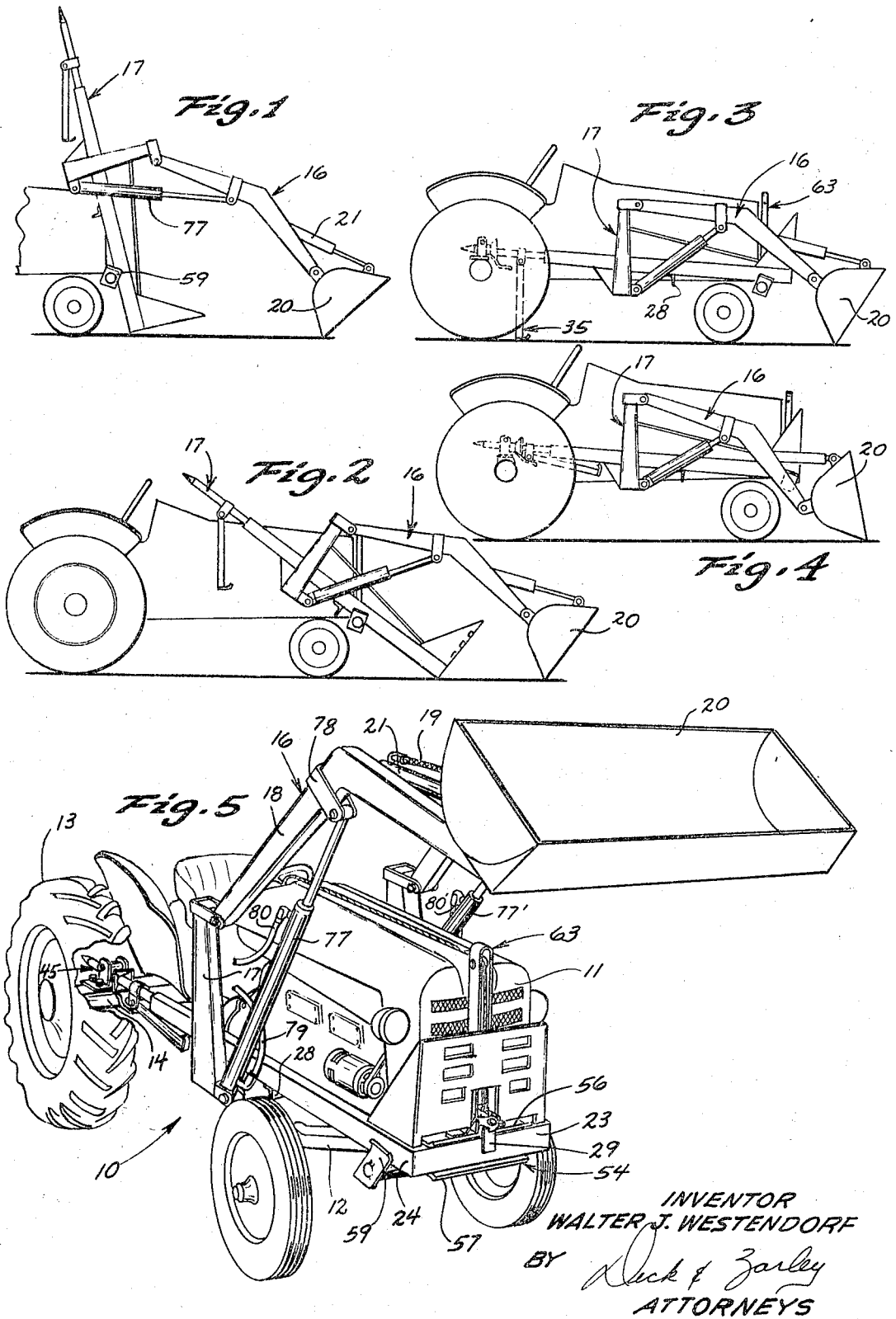

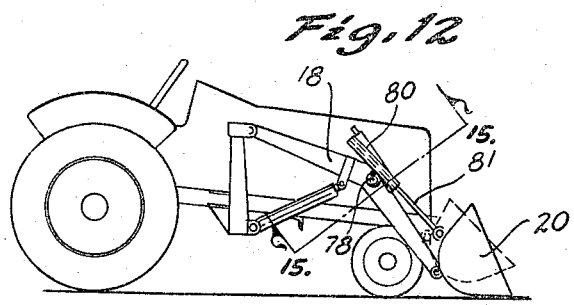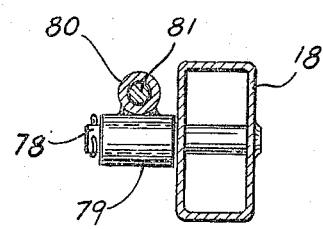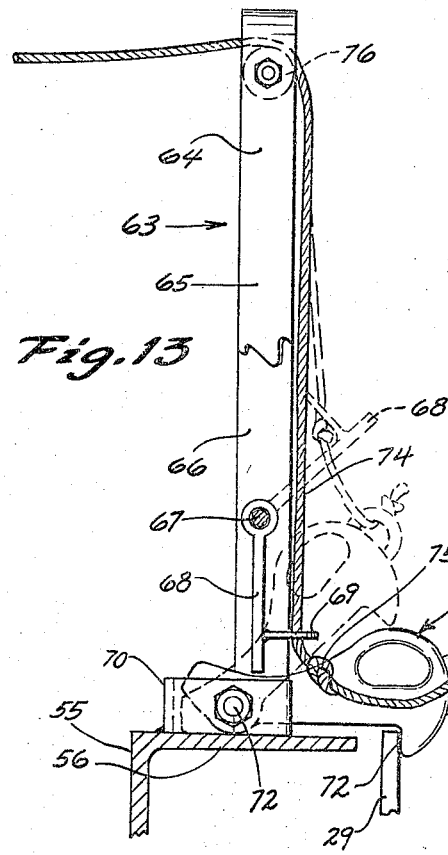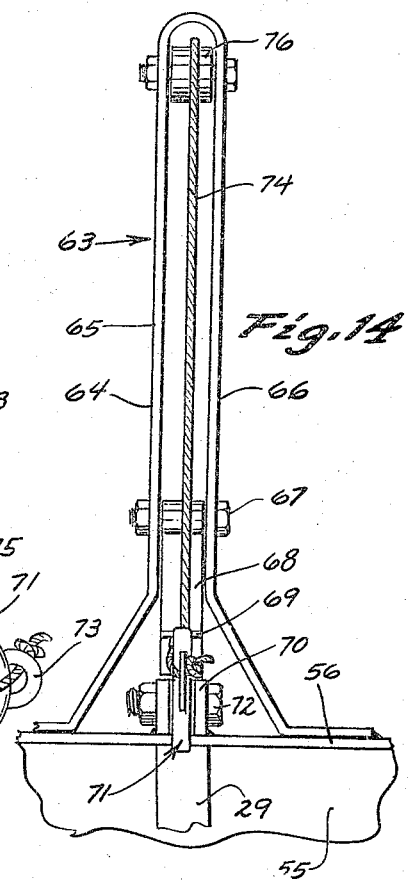

United States Patent Office 3,324,954
Patented June 13, 1967

3,324,954
LOADER DEVICE AND METHOD OF MOUNTING SAME ON TRACTOR
Walter J. Westendorf, Smithland, Iowa 51056
Filed Mar. 1, 1965, Ser. No. 435,943
18 Claims. (Cl. 172—1)

This invention relates to a loader device and more particularly to a loader device for a tractor which is quickly attached and detached therefrom.

Tractor loaders are usually mounted on the tractor by means of bolts, brackets, etc. It is frequently necessary to remove the loader from the tractor so that the tractor may be used for other purposes. Obviously, it is then necessary to once again attach the loader to the tractor when the loader is needed. Needless to say, it is a time consuming task to attach and detach the loader from the tractor due to the attachment apparatus provided thereon. Additionally, conventional loaders usually require the services of two men to attach the loader to the tractor or to detach the loader from the tractor.

The loader is usually propped up on barrels or the like when the loader has been detached from the tractor in an effort to prevent it from tipping over. This arrangement is extremely hazardous at best due to its unsteady position, especially when there are children playing nearby.

Therefore, it is a principal object of this invention to provide a loader device for a tractor which is quickly attachable and detachable therefrom.

A further object of this invention is to provide a loader device for a tractor which includes a sub-frame which supports the loader on the tractor and which also serves as a stand when the loader has been detached from the tractor.

A further object of this invention is to provide a loader device for a tractor which may be attached to the tractor by one man.

A further object of this invention is to provide a loader device for a tractor wherein it is only necessary for the operator to dismount from the tractor to hook up the hydraulic hoses and does not require any manual labor on his part.

A further object of this invention is to provide a loader device for a tractor wherein the loader device is attached to the tractor using the hydraulic power of the tractor.

A further object of this invention is to provide a loader device for a tractor which has an automatic kick-stand on its rearward end to aid in attaching the loader to the tractor.

A further object of this invention is to provide a loader device for a tractor which fits a variety of sizes of tractors.

A further object of this invention is to provide a loader device for a tractor which is automatically secured to the tractor.

A further object of this invention is to provide a loader device which has a pre-determined amount of "play" in its attaching apparatus to prevent damage to the equipment while the loader is in use.

A further object of this invention is to provide a loader device for a tractor which includes a bucket position indicating means thereon.

A further object of this invention is to provide a loader device for a tractor which will not accidentally be detached from the tractor.

A further object of this invention is to provide a loader device for a tractor which may be conveniently mounted on a tractor having wide track front wheels.

A further object of this invention is to provide a method for attaching a loader device to a tractor utilizing the hydraulic power of the tractor.

A further object of this invention is to provide a loader device for a tractor which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIGS. 1, 2, 3 and 4 are side views of the tractor and loader device illustrating the sequential relationship therebetween during the attachment of the loader to the tractor;

FIG. 5 is a perspective view of the loader device secured to a tractor with portions of the tractor cutaway to more fully illustrate the invention;

FIG. 6 is a fragmentary perspective view illustrating the guide pocket portion of the device and also illustrating the rearward end of an arm member of the sub-frame means about to be received thereby;

FIG. 7 is a fragmentary perspective view of the guide pocket portion of the device and also illustrating the rearward end of an arm member of the sub-frame means slidably extending therethrough and further illustrating the manner in which the guide pocket maintains the stand portion of the device in an inoperative position;

FIG. 8 is a sectional view of FIG. 7 as seen on line 8—8 of FIG. 7;

FIG. 9 is a perspective view of the sub-frame portion of the device;

FIG. 10 is a perspective view of the locking means which is secured to the forward end of the tractor;

FIG. 11 is a sectional view of the device seen on line 11—11 of FIG. 10, at an enlarged view;

FIG. 12 is a side view of the loader device mounted on a tractor illustrating the bucket position indicating means thereon;

FIG. 13 is a fragmentary side elevational view of the locking means which is secured to the forward end of the tractor;

FIG. 14 is a front elevational view of the device seen in FIG. 13; and

FIG. 15 is a sectional view of a portion of the buck position indicating means as seen on line 15—15 of FIG. 12 at an enlarged scale.

The numeral 10 generally designates a tractor having a forward end 11, front axle 12, rearward end 13 and a rear axle housing 14.

The numeral 15 in general designates the loader comprised of a frame means 16 and a sub-frame means 17. Frame means 16 includes a pair of spaced apart arm members 18 and 19 having a bucket 20 pivotally secured to the forward ends thereof. A hydraulic cylinder 21 is pivotally connected at its rearward end to arm member 18 and at its forward end to bucket 20 to hydraulically operate bucket 20.

Sub-frame means 17 is substantially U-shaped and includes a forward end 23 and a pair of spaced apart arm members 24 and 24' extending rearwardly from the opposite ends thereof. Inasmuch as arm members 24 and 24' are identical, only arm member 24 will be described with (") (') (") indicating identical structure on arm member 24'.

As seen in FIG. 9, arm member 24 has a vertical post 25 secured thereto intermediate the length thereof by welding or the like. Post 25 has a U-shaped bracket 26 secured to its upper end which extends forwardly therefrom and has a U-shaped bracket 27 secured to its lower end which also extends forwardly therefrom. A brace 30 has its upper end secured to the upper end of post 25 and its lower end secured to the forward end of arm member 24 and extends therebetween as seen in FIG. 9. Sub-frame means 17 is also provided with a radiator guard 31 on the forward end thereof having a horizontal slot 32 formed therein and a vertical slot 33 in communication therewith. An arm member 29 is secured to forward portion 23 by welding or the like and extends upwardly therefrom in an aligned relationship with slot 33.

As seen in FIG. 9, an inverted L-shaped bracket or stop means 28 is secured to the lower side of arm member 24 by any convenient means intermediate the length thereof. Arm member 24 is provided with a pipelike rearward portion 34 having a pointed rearward end.

The numeral 35 generally designates a stand means which is best illustrated in FIG. 9. Stand means 35 includes a collar 36 which selectively slidably embraces rearward portion 34 of arm member 24 and has a screw 37 threadably extending therethrough which engages rearward portion 34. An inverted U-shaped bracket 38 is welded to the bottom of collar 36 and has a bolt 39 extending between the ears of bracket 38. As seen in FIGS. 6, 7 and 8, a pipe 40 is pivotally connected at its upper end to bracket 38 by means of bolt 39 extending therethrough. Secured to the rearward surfaces of the ears of bracket 38 by welding or the like is a metal stop means 41 which limits pipe 40 in its rearward pivotal movement. A pipe 42 is telescopically received by pipe 40 and is maintained in varous positions of its telescopic movement with respect to pipe 40 by means of set screw 43 extending through pipe 40 and engaging pipe 42. The lower end of pipe 42 is provided with a curved foot portion 44 which curves upwardly and forwardly from the lower end thereof.

Secured to axle housing 14 at each of its ends is a guide pocket 45. Guide pocket 45 is best illustrated in FIGS. 5, 6, 7 and 8. Guide pocket 45 includes a base portion 46 which is provided with a plurality of holes formed therein to facilitate its attachment to the tractor axle housing by means of bolts. Secured to base portion 46 by welding or the like and extending upwardly therefrom is a pair of spaced apart ears 47 and 48. A bolt means 49 extends through and between the upper ends of ears 47 and 48 and is rotatably embraced by a bushing 50. A short length of hollow pipe 51 is welded to the bottom surface of bushing 50 between ears 43 and 44 and has its longitudinal axis at a right angle to the longitudinal axis of bushing 50 as best seen in FIG. 8. Pipe 51 is permitted a slight amount of pivotal movement due to its being secured to the rotatably mounted bushings 50. The engagement of the lower rearward end of pipe 51 and base portion 46 limits the upward pivotal movement of the forward end of pipe 51 and the engagement of the lower forward end of pipe 51 and base portion 46 limits the downward pivotal movement of the forward end of pipe 51.

A substantially cone-shaped guide 52 is provided at the forward end of pipe 51 to aid in guiding rearward portion 34 of arm member 24 into pipe 51. As best illustrated in FIGS. 6, 7 and 8, guide 52 has secured to its lower surface an arcuate finger member 53 extending downwardly and forwardly therefrom.

Secured to the forward end of tractor 10 by bolts or the like is a substantially U-shaped channel member 54 having a base portion 55, an upper flange 56 extending forwardly and upwardly therefrom and a lower flange 57 extending forwardly and downwardly therefrom.

An elongated pipe 58 is secured to the lower surface of flange 57 by welding or the like and extends outwardly from the opposite ends thereof as best seen in FIGS. 10 and 11. A pair of guides 59 and 60 are welded to the outer ends of pipe 58 respectively and extend upwardly and forwardly therefrom. Rotatably embracing pipe 58 between each of the opposite ends of channel member 54 and its adjacent guide are rollers 61 and 62 respectively.

A locking means 63 is mounted on the upper surface of flange 56 and includes an inverted substantially U-shaped bracket 64 having the lower ends of its leg members 65 and 66 secured to the upper surface of flange 56 by welding or the like. Bracket 64 has a bolt 67 extending through and between leg members 65 and 66 at a point upwardly from its lower end. A latch 68 is pivotally secured at its upper end to bolt 67 and normally extends downwardly therefrom as seen in FIGS. 13 and 14. Latch 68 has an ear member 69 secured thereto intermediate its length which extends forwardly therefrom as seen in FIG. 13 and is provided with a hole extending therethrough. A U-shaped bracket 70 is welded to the upper surface of flange 56 at a point below latch 68 between the flared lower ends of leg members 65 and 66. A hook means 71 is pivotally connected at its rearward end to bracket 70 by means of bolt 72 extending therethrough. Hook means 71 is provided with a shoulder portion 72 on its lower forward end and is also provided with an arcuate loop member 73 secured thereto. As seen in FIGS. 13 and 14, the lower end of latch 68 normally is positioned directly above the upper rearward end of hook means 71 to limit the upward pivotal movement of hook means 71 at times. A rope element 74 has its forward end extending through loop 73 and is knotted as seen in FIG. 13. Rope 74 is provided with a second knot 75 at a predetermined distance rearwardly of the forward end thereof. Rope 74 extends through the opening in ear 69 and passes over pulley means 76 which is rotatably mounted in the upper end of bracket 63. Rope 74 normally extends rearwardly to the vicinity of the tractor seat so that the operator may selectively control the operation of hook means 71. As seen in FIG. 5, shoulder 72 of hook means 71 is adapted to engage the upper forward surface of arm member 29 to maintain the forward portion of sub-frame means 17 in channel member 54.

FIG. 12 illustrates a bucket position indicating means 77 which is extremely helpful to the operator during the operation of the loader and is also helpful to the operator during the attachment operation of the loader to the tractor. Bucket position indicating means 77 includes a horizontal pipe stub 78 which has its inner end secured to arm member 18 by welding or the like and which rotatably receives a collar 79 thereon. An elongated sleeve 80 is welded at right angles to collar 79 and is adapted to slidably receive an elongated rod 81 extending therethrough. Rod 81 has its forward end pivotally connected to the rearward side of bucket 20.

The numeral 77 designates a double acting hydraulic cylinder which is pivotally connected at its lower end to bracket 27 and is pivotally connected at its upper end to bracket 78 on arm member 18. A hydraulic hose 79 is fluidly connected to the lower end of hydraulic cylinder 77 and extends rearwardly therefrom. Fluidly connected to the upper end of hydraulic cylinder 77 is a hose 80 which also extends rearwardly therefrom. The numeral 77' designates a double acting cylinder which is pivotally connected at its lower end to bracket 27' and is pivotally connected at its upper end to bracket 78' on arm member 19. A hydraulic hose 79' (not shown) is fluidly connected to the lower end of hydraulic cylinder 77' and extends rearwardly therefrom. Fluidly connected to the upper end of hydraulic cylinder 77' is a hydraulic hose 80' which also extends rearwardly therefrom.

As best seen in FIG. 5, the rearward ends of arm members 18 and 19 are pivotally connected to brackets 26 and 26' respectively.

The normal method of operation is as follows: The loader device would normally be supported in the position seen in FIG. 1 when not in use. As seen in FIG. 1, the forward end of bucket 20 is pointed downwardly into the ground and the forward end 23 of sub-frame 17 is also engaging the ground. The device is extremely stable in this position due to the wide front end of the bucket 20 engaging the ground and the straight forward end 23 of sub-frame 17 engaging the ground. The engagement of the device with the ground just described makes it practically impossible to tip the device over either laterally or longitudinally.

Channel member 54 remains bolted to the forward end of the tractor at all times and does not interfere with the ordinary operation of the tractor. Guide pockets 45 and 45' (not shown) also remain bolted to the tractor at all times and do not interfere with the normal operation thereof.

When it is desired to attach the loader device to the tractor, it is simply necessary to drive a tractor into the position shown in FIG. 1 so that the forward end thereof is placed adjacent sub-frame means 17 so that arm members 24 and 24' will be aligned with rollers 61 and 62, respectively. The operator would then dismount from the tractor and fluidly connect hydraulic hoses 79, 79', 80 and 80' to the hydraulic pump on the tractor. The operator would then remount the tractor and by operating the hydraulic pump on the tractor cause hydraulic cylinders 77 and 77' to withdraw their respective piston rods. The withdrawal of the piston rods into their respective hydraulic cylinders causes sub-frame means 17 and frame means 16 to pivot with respect to each other as seen in FIG. 2. The withdrawal of the piston rods into their respective hydraulic cylinders causes arm members 24 and 24' to engage rollers 61 and 62, respectively, and to pivot thereabout so that the rearward ends of arm members 24 and 24' are pivotally moved rearwardly and downwardly. The continued withdrawal of the piston rods into their respective hydraulic cylinders will eventually cause forward end 23 to be raised from the ground. Arm members 24 and 24' have the tendency to roll forwardly on their respective rollers until stop means 28 and 28' engage the rearward ends of the rollers to prevent the continued forward movement of arm members 24 and 24' with respect to the tractor.

Arm members 24 and 24' would be pivoted about rollers 61 and 62 until the lower ends of stand means 35 and 35' respectively engage the ground. Stand means 35 and 35' prevent the rearward ends of arm members 24 and 24' from inadvertently pivoting too far downwardly. Preferably, stand means 35 and 35' have been previously adjusted so that the pointed rearward ends of arm members 24 and 24' would be slightly below the axis of pipes 51 and 51' respectively. The tractor is then driven forwardly with respect to the loader device. The lower surface of guides 52 and 52' engage the rearward ends of arm members 24 and 24' and raise them slightly so that the rearward ends may pass into pipes 51 and 51' as the tractor is driven forwardly. Arm members 24 and 24' simply roll on rollers 61 and 62' as the tractor is moved forwardly with respect to the loader device.

As previously stated, the inclined lower forward surfaces of guides 52 and 52' cause the rearward ends of arm members 24 and 24' to be raised slightly thereby raising foot members 44 and 44' out of engagement with the ground. The forward movement of the tractor with respect to the loader device causes finger member 53 to engage the rearward end of pipe 40 and to pivot the same to the position seen in FIG. 8. Finger 53 thereby provides a means for moving stand means 35 to an inoperative position which does not interfere with the normal operation of the tractor or the loader device. The ability of the rearward ends of arm members 24 and 24' to extend through pocket guides 45 and 45', respectively, permits the loader device to be mounted on a variety of different sizes of tractors. Stand means 35 and 35' can be selectively slidably moved on rearward end portions 34 and 34' respectively to compensate for these different sizes of tractors. The fact that stand means 35 and 35' are longitudinally adjustable permits them to be also adjusted for a wide variety of tractors. The ability of pipe 51 of pocket guide 45 to slightly rotate about a horizontal axis permits a small amount of play in the device to prevent damage to the apparatus of the loader device.

Arm members 24 and 24' will be moved rearwardly with respect to the tractor as the tractor is driven forwardly until forward end 23 has been completely received by channel member 54. Upper flange 56 of channel member 54 will extend slightly outwardly through horizontal slot 32 in radiator guard 31 and the forward end of hook means 71 will extend outwardly through vertical slot 33 in radiator guard 31. Forward end 23 will be positioned between upper flange 56 and lower flange 57. Rope 74 has been secured to latch 68 and hook means 71 so that the rearward movement thereof will cause latch 68 to be pivoted upwardly out of engagement with hook means 71 without causing hook means 71 to be pivoted upward. Hook means 71 is provided with a lower forward portion which is curved downwardly and rearwardly so that the upper end of arm member 29 may pivot hook means 71 upwardly as the tractor is moved forwardly with respect to the sub-frame means 17. As soon as the upper end of arm member 29 has passed the plane of shoulder 72, the weight of hook means 71 will cause it to pivot downwardly so that shoulder 72 will be positioned forwardly of the upper forward end of arm member 29 to maintain forward end 23 within channel member 54. As soon as hook means 71 has been locked over arm member 29, the operator will release rope 74. The weight of latch 68 causes it to pivot downwardly to the position seen in FIG. 13. With latch 68 in the position seen in FIG. 13, it is not possible for hook means 71 to be raised upwardly. This feature prevents the accidental disengagement between hook means 71 and arm member 29. Hook means 71 can be disengaged from arm member 29 only by pulling rearwardly on rope 74 so that latch 68 is disengaged and so that the knot on the forward end of rope 74 causes hook means 71 to be pivoted upwardly.

It should be noted that channel member 54 could be more U-shaped and that forward portion 23 could also be changed in shape to be compatible with channel member 54. The loader device would possibly be provided with a somewhat more "play" so that a slight twisting of the loader means would not damage the equipment. The loader device is permitted some "play" due to the construction of the guide pockets 45 and 45' which aids in preventing damage to the equipment when a slight twisting effect is imposed on the loader device.

The bucket position indicating means illustrated in FIGS. 12 and 15 provide a novel means for indicating to the operator the exact relationship of the forward end of the bucket 20 to the ground. The relationship of the bucket to the ground is extremely important during loader operations as well as during the attachment and detachment of the loader device to or from the tractor. It is obvious that the pivotal movement of bucket 20 will cause a change in the sliding relationship between sleeve 80 and rod 81 extending therethrough. Preferably, a rod 81 is so pivoted to the rearward end of bucket 20 so that its upper end will be flush with the upper end of sleeve 80 when the bottom surface of bucket 20 is in a horizontal position. The upper end of rod 81 is then caused to be exposed above the upper end of sleeve 80 when the forward end of bucket 20 has been raised. The upper end of rod 81 would be withdrawn into sleeve 80 when the bucket 20 was in a digging position. The bucket position indicating means just described not only aids in helping the operator to determine the position of the bucket during loading operations but also aids in indicating to him that the forward end of the bucket is in a downwardly extending position so that the bucket will not slide along the ground when the loader device is being attached to the tractor or detached from the tractor.

Thus it can be seen that a novel loader device has been described herein which is quickly and easily attached to a tractor through the use of the available hydraulic power thereon without any manual labor on the part of the tractor operator. It can be appreciated that the loader device is quickly and easily attached to the tractor or detached from the tractor in a safe manner due to such safety features as guides 59 and 60 (which prevent arm members 24 and 24' respectively from accidentally disengaging from their respective rollers); stands 35 and 35' which are automatically retracted from their operative positions; the remote control of the locking means 63, and the use of hydraulic power and the tractor power itself to mount the loader device onto the tractor.

Not only is the device safely attached and detached but it is also extremely safe when placed on the ground in the position as seen in FIG. 1. This stability is accomplished chiefly by the sub-frame means 17 serving as a rear support for the loader device. It can be appreciated from the description herein that sub-frame means 17 not only serves to provide a rear support for the loader device but also serves as a means for attaching the loader device to the tractor.

Thus it can be seen that the device accomplishes at least all of its stated objectives.

Some changes may be made in the construction and arrangement of my loader device for a tractor without departing from the real spirit and purpose of my invention, and it is my intention to cover by my claims, any modified forms of structure or use of mechanical equivalents which may be reasonably included within their scope.

I claim:

1. In a loader device for a tractor, comprising,
   a frame means having rearward and forward ends and adapted to have a materials handling implement operatively connected to its forward end,
   an elongated sub-frame means having rearward and forward ends operatively pivotally connected intermediate its length to said frame means,
   said sub-frame means being adapted to be detachably secured at its forward end to a tractor and slidably received at its rearward end by a hollow guide pocket means mounted on the tractor rearwardly of the forward end thereof,
   said sub-frame means serving as a stand at times to support said frame means when the loader device is detached from the tractor and serving as a means for operatively mounting on the loader device on the tractor at other times, said hollow guide pocket means being mounted on said tractor so as to permit the rearward end of said sub-frame means to extend therethrough to permit the loader device to be mounted on tractors having various lengths.

2. The device of claim 1 wherein the forward end of said sub-frame means is adapted to be detachably secured to a bracket means mounted on the forward end of the tractor.

3. The device of claim 1 wherein said sub-frame means includes a pair of spaced-apart arm members extending rearwardly from the forward end thereof, each of said arm members having their rearward ends slidably extending through said guide pocket means secured to the tractor adjacent the rearward end thereof.

4. The device of claim 3 wherein said arm members each have an adjustable stand means having an adjustable length and being selectively slidably mounted thereon intermediate their lengths.

5. The device of claim 4 wherein each of said stand means are operatively pivotally secured to its respective arm member so that said stand means will normally extend downwardly therefrom when said arm member is substantially horizontal and so that the lower end of said stand means may be pivoted only upwardly and forwardly from its downwardly extending position.

6. In a loader device for a tractor, comprising,
   a frame means having rearward and forward ends and adapted to have a materials handling implement operatively connected to its forward end,
   an elongated sub-frame means having rearward and forward ends operatively pivotally connected intermediate its length to said frame means,
   said sub-frame means being adapted to be detachably secured at its forward end to a tractor and slidably received at its rearward end to a hollow guide pocket means mounted on the tractor rearwardly of the forward end thereof,
   said sub-frame means serving as a stand at times to support said frame means when the loader device is detached from the tractor and serving as a means for operatively mounting on the loader device on the tractor at other times,
   an elongated, channel-shaped bracket adapted to be secured to the forward end of the tractor,
   a hook means pivotally secured to said bracket means, said hook means pivotally movable to engage said sub-frame means to detachably secure said sub-frame means to the tractor, said guide pocket means being mounted on said tractor so as to permit the slidable extension of the rearward end of said sub-frame means therethrough until the forward end of said sub-frame means is received by said bracket to permit the sub-frame means to be secured to tractors having various lengths.

7. The device of claim 6 wherein said hook means has a rope means secured thereto for remotely pivotally moving said hook means out of engagement with said sub-frame means at times.

8. In a loader device for a tractor, comprising,
   a frame means having rearward and forward ends and adapted to have a materials handling implement operatively connected to its forward end,
   an elongated sub-frame means having rearward and forward ends operatively pivotally connected intermediate its length to said frame means,
   said sub-frame means being adapted to be detachably secured at its forward end to a tractor and detachably secured at its rearward end to the tractor rearwardly of the forward end thereof,
   said sub-frame means serving as a stand at times to support said frame means when the loader device is detached from the tractor and serving as a means for operatively mounting on the loader device on the tractor at other times,
   said sub-frame means including a pair of spaced-apart arm members extending rearwardly from the forward end thereof,
   first and second spaced apart guide pocket means secured to the tractor adjacent its rearward end adapted to each slidably receive the rearward end of one of said arm members,
   each of said guide pocket means including a base portion secured to the tractor, a pair of spaced apart ear members secured at their lower ends to said base portion and extending upwardly therefrom, a bushing operatively rotatably extending between said ear members adjacent their upper ends, an elongated sleeve having rearward and forward ends secured to said bushing at the lower side thereof, the longitudinal axis of said sleeve being at a right angle to the axis of rotation of said bushing and being substantially parallel to the longitudinal axis of said arm member, said sleeve having a flared portion on its forward end to guide said arm member into said sleeve.

9. In a loader device for a tractor, comprising,
   a frame means having rearward and forward ends and adapted to have a materials handling implement operatively connected to its forward end,
   an elongated sub-frame means having rearward and forward ends operatively pivotally connected intermediate its length to said frame means,
   said sub-frame means being adapted to be detachably secured at its forward end to a tractor and detachably secured at its rearward end to the tractor rearwardly of the forward end thereof,
   said sub-frame means serving as a stand at times to support said frame means when the loader device is detached from the tractor and serving as a means for operatively mounting on the loader device on the tractor at other times, a cross member secured to the forward end of said tractor and extending laterally from both sides thereof, a flange member secured to each of the ends of said cross member and extending upwardly therefrom, a roller means mounted on said cross brace between said tractor and each of said flange members, said roller means adapted to support said arm members of said sub-frame means thereon at times.

10. The device of claim 9 wherein each of said arm members of said sub-frame means have stop means secured thereto intermediate their lengths adapted to engage said roller means to prevent said sub-frame from moving forwardly with respect to said tractor during the attaching of said sub-frame means to said tractor.

11. In a loader device for a tractor, comprising, a frame means having rearward and forward ends and adapted to have a materials handling implement operatively connected to its forward end, an elongated sub-frame means having rearward and forward ends operatively pivotally connected intermediate its length to said frame means, said sub-frame means being adapted to be detachably secured at its forward end to a tractor and detachably secured at its rearward end to the tractor rearwardly of the forward end thereof, said sub-frame means serving as a stand at times to support said frame means when the loader device is detached from the tractor and serving as a means for operatively mounting on the loader device on the tractor at other times, said tractor having a horizontal channel-shaped bracket means secured to its forward end adapted to receive the forward end of said sub-frame means at times, an inverted U-shaped bracket secured to said channel-shaped bracket and extending upwardly therefrom, a locking pin pivotally secured at one of its ends to the lower end of said inverted U-shaped bracket and pivoting about a horizontal axis and having a hook portion on its other end adapted to engage said sub-frame when said forward end of said sub-frame is received by said bracket on said tractor and maintain said sub-frame in said bracket on said tractor, limiting means limiting the upward pivotal movement of said locking pin, and means interconnecting said limiting means and said locking pin and extending rearwardly therefrom for remote control thereof to disengage said limiting means and to disengage said locking pin from said sub-frame at times.

12. The device of claim 11 wherein said limiting means includes a normally vertically finger member pivotally secured at its upper end to said inverted U-shaped bracket and being in the upward pivotal path of said locking pin.

13. The method of mounting a loader device on a tractor, said loader device being initially detached from the tractor and including a first frame means substantially vertically extended and ground supported adapted to be detachably secured to a tractor and an elongated second frame means operatively pivotally connected at one of its ends to said first frame means intermediate the length thereof, a hydraulic ram means pivotally secured to and extending between said first frame means and said second frame means for pivoting said second frame means with respect to said first frame means, comprising the following steps, driving the tractor adjacent the loader device so that the forward end of the tractor is adjacent the rearward end of the loader device, fluidly connecting the hydraulic ram means to the hydraulic pump means on the tractor, operating the hydraulic pump means so that the hydraulic ram means pivots said first frame means with respect to said second frame means and causes said first frame means to engage and pivot about the forward end of said tractor until said first frame means is substantially horizontal, driving the tractor forward with respect to said first frame means so that said first frame means is moved rearwardly on said tractor, detachably securing the rearward end of said first frame means to said tractor, and detachably securing the forward end of said first frame means to the forward end of said tractor.

14. The method of claim 13 wherein the rearward and forward ends of said first frame means are automatically detachably secured to said tractor without the tractor operator leaving the tractor.

15. The method of claim 13 wherein said tractor has a hollow guide pocket means secured thereto adjacent the rearward end thereof, said first frame means being slidably received by said guide pocket means when the tractor is driven forwardly with respect to said first frame means.

16. In a loader device for a tractor, comprising, a frame means having rearward and forward ends and adapted to have a materials handling implement operatively connected to its forward end, an elongated sub-frame means having rearward and forward ends operatively pivotally connected intermediate its length to said frame means, said sub-frame means being adapted to be detachably secured at its forward end to a tractor and detachably secured at its rearward end to the tractor rearwardly of the forward end thereof, said sub-frame means serving as a stand at times to support said frame means when the loader device is detached from the tractor and serving as a means for operatively mounting on the loader device on the tractor at other times, said sub-frame means including a pair of spaced apart arm members extending rearwardly from the forward end thereof, each of said arm members having their rearward ends slidably extending through a guide pocket means secured to the tractor adjacent the rearward end thereof, said arm members each having an adjustable stand means having an adjustable length and being selectively slidably mounted thereon intermediate their lengths, each of said stand means being operatively pivotally secured to its respective arm member so that said stand means will normally extend downwardly therefrom when said arm member is substantially horizontal and so that the lower end of said stand means may be pivoted only upwardly and forwardly from its downwardly extending position, each of said guide pocket means having secured thereto a means for pivoting said stand means from its downwardly extending position when said arm member is slidably received by said guide pocket means.

17. In a loader device for a tractor, comprising, a frame means having rearward and forward ends and adapted to have a materials handling implement operatively connected to its forward end, an elongated sub-frame means having rearward and forward ends operatively pivotally connected intermediate its length to said frame means, said sub-frame means being adapted to be detachably secured at its forward end to a tractor and detachably secured at its rearward end to the tractor rearwardly of the forward end thereof, said sub-frame means serving as a stand at times to support said frame means when the loader device is detached from the tractor and serving as a means for operatively mounted on the loader device on the tractor at other times, a cross member secured to the forward end of said tractor and extending laterally from both sides thereof, a roller means mounted on said cross member between said tractor and each of the ends thereof, said roller means adapted to support said arm members of said sub-frame means thereon at times, and means on said cross member adjacent each of its ends adapted to maintain said arm members on said roller means.

18. In combination with a tractor having rearward and forward ends, a frame means including spaced apart first and second arm members and having rearward and forward ends, said frame means adapted to pivotally receive a materials handling means on its forward end, a sub-frame means including an elongated forward end portion having third and fourth arm members extending rearwardly from its opposite ends, a vertical post member secured to each of said third and fourth arm members and extending substantially transversely upwardly therefrom, said first and second arm members being pivotally secured to the upper ends of said vertical post members respectively, a first hydraulic cylinder means pivotally secured at one of its ends to the vertical post on said third arm member and pivotally secured at its other end to said first arm member intermediate the length thereof, a second hydraulic cylinder means pivotally secured at one of its ends to the vertical post on said fourth arm member and pivotally secured at its other end to said second arm member intermediate the length thereof, the rearward ends of said third and fourth arm members being detachably secured to said tractor adjacent the rearward end thereof, said forward portion of said sub-frame means being being received by a channel-shaped bracket means on said tractor at the forward end thereof, said locking means being comprised of a vertical support means secured at its lower end to said bracket, a hook member pivotally secured to said vertical support means and adapted to engage said forward portion of said sub-frame means at times, a limiting means pivotally secured to said vertical support means above said hook means and adapted to limit the upward pivotal movement of said hook means at times, and means connected to said limiting means and said hook means adapted to selectively pivot said limiting means and hook means at times.

References Cited

UNITED STATES PATENTS

| | | | |
|---|---|---|---|
| 2,517,582 | 8/1950 | Lull | 214—140 |
| 2,972,424 | 2/1961 | Cadwell | 214—131 X |
| 3,131,823 | 5/1964 | Foster et al. | 214—140 |

FOREIGN PATENTS

| | | |
|---|---|---|
| 655,785 | 1/1964 | Canada. |
| 1,372,650 | 8/1964 | France. |

HUGO O. SCHULZ, *Primary Examiner.*